United States Patent [19]
Sigler

[11] Patent Number: 5,960,829
[45] Date of Patent: Oct. 5, 1999

[54] NO DRIP VACUUM TIGHT CONNECTOR

[75] Inventor: James A. Sigler, Perrysville, Ohio

[73] Assignee: Sealand Technology, Inc., Big Prairie, Ohio

[21] Appl. No.: 08/838,238

[22] Filed: Apr. 17, 1997

[51] Int. Cl.⁶ .................................................. F16L 37/28
[52] U.S. Cl. ............................... 137/614.03; 137/614.05; 137/236.1; 4/431
[58] Field of Search ......................... 137/614.03, 614.05, 137/236.1; 4/431

[56] References Cited

U.S. PATENT DOCUMENTS

| | | | |
|---|---|---|---|
| 2,753,195 | 7/1956 | Palmer | 137/614.03 |
| 4,319,366 | 3/1982 | Baker, Jr. et al. | 4/321 |
| 4,893,720 | 1/1990 | Bachmann et al. | 220/5 A |
| 4,917,149 | 4/1990 | Grantham | 137/614.03 |
| 5,165,457 | 11/1992 | Olin et al. | 4/300 |
| 5,402,826 | 4/1995 | Molnar et al. | 137/614.01 |
| 5,408,704 | 4/1995 | Bailey et al. | 4/321 |
| 5,515,554 | 5/1996 | Clear et al. | 4/432 |
| 5,621,924 | 4/1997 | Friedmann et al. | 4/321 |

FOREIGN PATENT DOCUMENTS

| | | |
|---|---|---|
| 2135134 | 5/1995 | Canada . |
| 0190388 | 12/1989 | European Pat. Off. . |

*Primary Examiner*—A. Michael Chambers
*Attorney, Agent, or Firm*—Nixon & Vanderhye P.C.

[57] ABSTRACT

A no-drip, substantially air, vacuum, and liquid tight connection is provided between a conduit and a tank, such as a combined sewage and holding tank for a boat or recreational vehicle. The connection may include first and second hollow tubes having a telescopic relationship when moved into association with each other, and openings within them that are aligned to allow fluid flow between a conduit and the tank. A cover may slide over the first tube and be spring biased into a position covering the first tube, while a blocking element may slide within the second tube and be spring biased to a position blocking the second opening. A holding element may hold the tubes together with their openings aligned against the bias of the springs. Initial positioning elements on the blocking element end wall and the first tube end wall ensure proper relative positioning of those components to facilitate their movement with respect to each other.

20 Claims, 14 Drawing Sheets

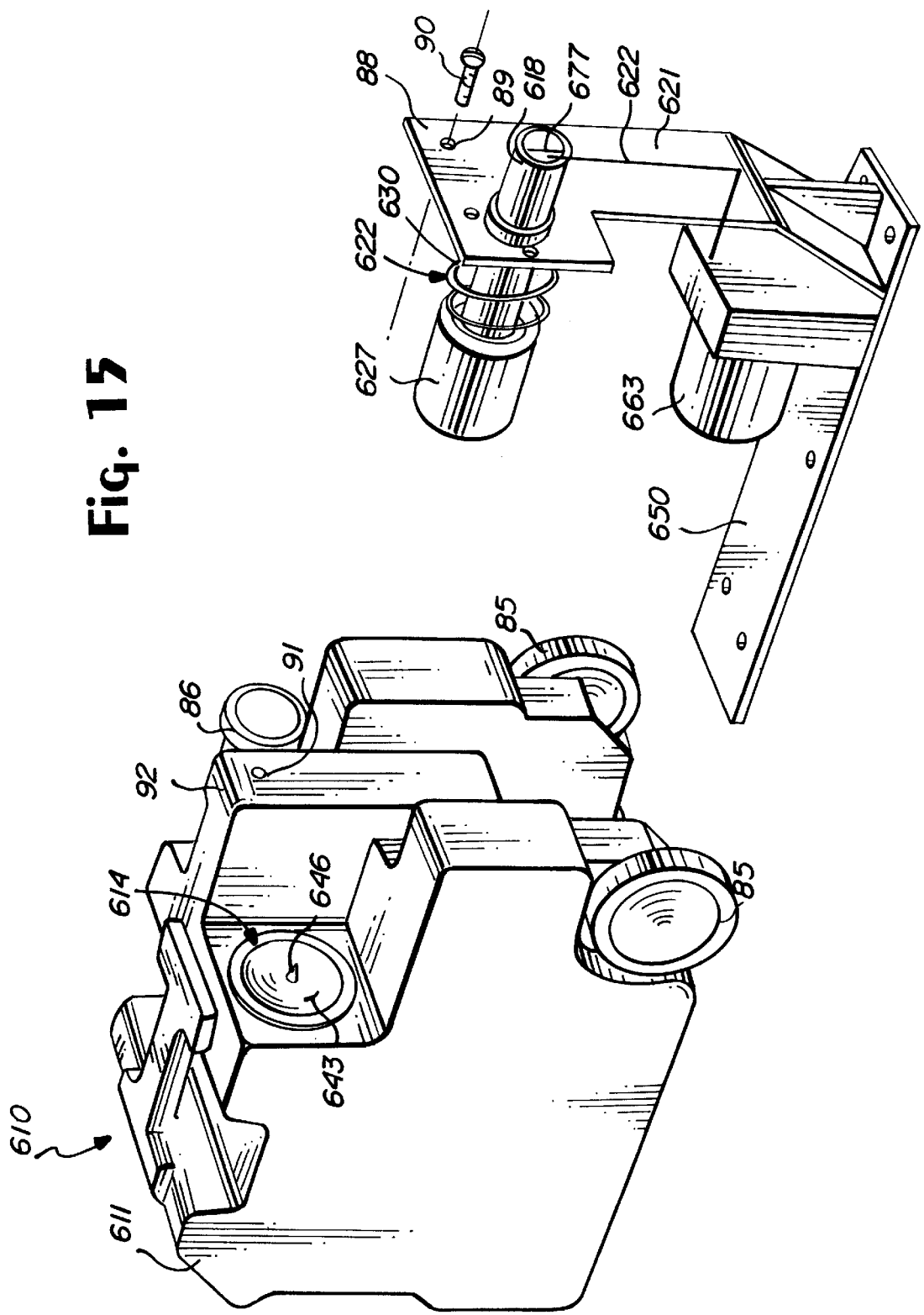

NO DRIP VACUUM TIGHT CONNECTOR

BACKGROUND AND SUMMARY OF THE INVENTION

In boats and recreational vehicles it has long been desirable to provide a sewage holding tank which can be removed from the boat or RV to be pumped out, and replaced with another tank, or after emptying the original tank can be reinstalled. For example one such proposal for accomplishing this result is shown in U.S. Pat. No. 5,408,704. In such systems (or whenever a connection is provided between a conduit and a tank when the tank and conduit handle toxic or dangerous fluids), it is highly undesirable to have any leakage or dripping of liquids as the tank is being removed or reinstalled. This is especially important if—as has become desirable as shown by co-pending U.S. application Ser. No. 08/551,029 filed Oct. 31, 1995, now U.S. Pat. No. 5,681,148, issued Oct. 28, 1997, and Australian application serial no. 14895/97 filed Feb. 25, 1997, and U.S. application Ser. No. 08/839,267 filed Apr. 17, 1997 (atty. dkt. 19-125)—the holding tank also functions as a vacuum tank, operatively connected to a vacuum pump. In such situations a no drip, fluid (liquid and gas, e.g. vacuum) tight connection is particularly important. While a no drip, fluid tight, connection is important it must be able to be effected in a simple and quick manner.

According to the present invention a substantially no drip fluid (vacuum) tight connection between a conduit and a tank, and a tank assembly (particularly a combined sewage holding and vacuum tank assembly) for utilizing the connection, are provided. The invention is simple and easy to construct, install, and utilize, yet provides a substantially no drip and fluid tight connection making a replaceable combined sewage holding and vacuum tank very practical.

According to one aspect of the present invention a substantially no drip fluid tight connection between a conduit and a tank are provided comprising the following components: A first elongated hollow element having an end wall, a circumferential wall with inner and outer surfaces and a first opening extending through the circumferential wall between the inner and outer surfaces. An elongated first opening cover mounted in substantially fluid tight engagement with the outer surface of the first hollow element and reciprocal with respect to the first hollow element to move between a first position covering the first opening and substantially preventing fluid passage therethrough, and a second position at least partially uncovering the first opening to allow fluid passage therethrough. A second elongated hollow element having a circumferential wall with inner and outer surfaces. and a second opening extending through the circumferential wall between the inner and outer surfaces. An elongated second opening blocking element mounted in substantially fluid tight engagement with the inner surface of the second hollow element and reciprocal with respect to the second hollow element to move between a first position blocking the second opening and substantially preventing fluid passage therethrough, and a second position at least partially exposing the second opening to allow fluid passage therethrough, the blocking element having an end wall. And, biasing means for biasing the cover to the first position and the blocking element to the first position. One of the hollow elements is configured to be connected to a tank, and the other of the hollow elements is configured to be connected to a conduit.

The biasing means may comprise any conventional type of spring, compressible material, pneumatic elements, or the like, as long as they provide a predetermined desired force to bias one component to a particular position, and allow movement against the bias. For example the biasing means may comprise a first coil spring (metal or plastic) disposed over the hollow element outer surface and mounted between the cover and a first relatively stationary support, and a second coil spring disposed within the second hollow element and acting between the blocking element and a second relatively stationary support, the first hollow element may be connected to a conduit, and the second element to a tank. A holding element may be provided which releasably holds the cover and blocking element in the second positions thereof against the bias of the biasing means, so that fluid flows through the first and second hollow elements between the conduit and the tank.

The second hollow element may be mounted either exteriorly of the tank or within the tank. Preferably the first hollow element has substantially the same cross-sectional shape and dimensions as the blocking element and an initial positioning element is associated with each of the blocking element end wall and the first hollow element end wall so that when the first hollow element and the blocking element are moved into engagement with each other the positioning elements ensure proper relative positioning thereof. For example the positioning elements may comprise a single centrally located conical or hemispherical projection on the blocking element cooperating with a conical or hemispherical depression in the first element end wall, or vice versa.

The hollow elements may be tubular, having generally circular cross-sections, or may have polygonal cross-sections. The second tubular element can comprise a pair of annular ends with a tubular segment (e.g. of about 90–180°) connected to the annular ends, with the segment having the second opening therein. The first hollow element may be operatively connected to a plurality of different types of conduits, which may be connected to a toilet, vacuum pump, vent, or other components.

According to another aspect of the present invention a combined sewage holding and vacuum tank assembly for a boat or recreational vehicle is provided. The assembly comprises the following components: A tank body having an inlet. A handle connected to the tank body to allow ready lifting, placement, and/or carrying of the tank body. A vacuum pump. A conduit for operatively connecting the inlet to the vacuum pump. And, means for providing a readily connectable and disconnectable substantially air and liquid tight connection between the conduit and the inlet. The tank may have rolling support elements, such as wheels, rollers, or casters.

The means for providing a substantially air and liquid tight connection between the conduit and the inlet may comprise any type of conventional bayonet or telescopic connection for such purposes, and is preferably substantially no drip. One preferred embodiment of such means comprises the following components: A first elongated hollow element having an end wall, a circumferential wall with inner and outer surfaces, and a first opening extending through the circumferential wall between the inner and outer surfaces. An elongated first opening cover mounted in substantially fluid tight engagement with the outer surface of the first hollow element and reciprocal with respect to the first hollow element to move between a first position covering the first opening and substantially preventing fluid passage therethrough, and a second position at least partially uncovering the first opening to allow fluid passage therethrough. A second elongated hollow element having a wall with inner and outer surfaces, and a second opening extending through the wall between the inner and outer surfaces. And, an elongated second opening blocking element mounted in substantially fluid tight engagement with the inner surface of the second hollow element and reciprocal with respect to the second hollow element to move between a first position blocking the second opening and substantially preventing fluid passage therethrough, and a second position at least partially exposing the second opening to allow fluid passage therethrough, the blocking element having an end wall. One of the hollow elements is connected to the tank, and the other of the hollow elements is connected to the conduit.

The details of the air and liquid tight connection may be specifically as described above.

It is the primary object of the present invention to provide a simple to make, use and install—yet highly effective—substantially no drip fluid tight connection between a conduit and a tank, and a combined sewage holding and vacuum tank assembly for a boat or recreational vehicle containing such a connection. This and other objects of the invention will become clear from an inspection of the detailed description of the invention, and from the appended claims.

BRIEF DESCRIPTION OF THE DRAWINGS

FIG. 15 is an exploded view of the tank assembly of FIG. 14 showing the conduit and vacuum pump disconnected from the tank assembly.

DETAILED DESCRIPTION OF THE DRAWINGS

Figure 1:
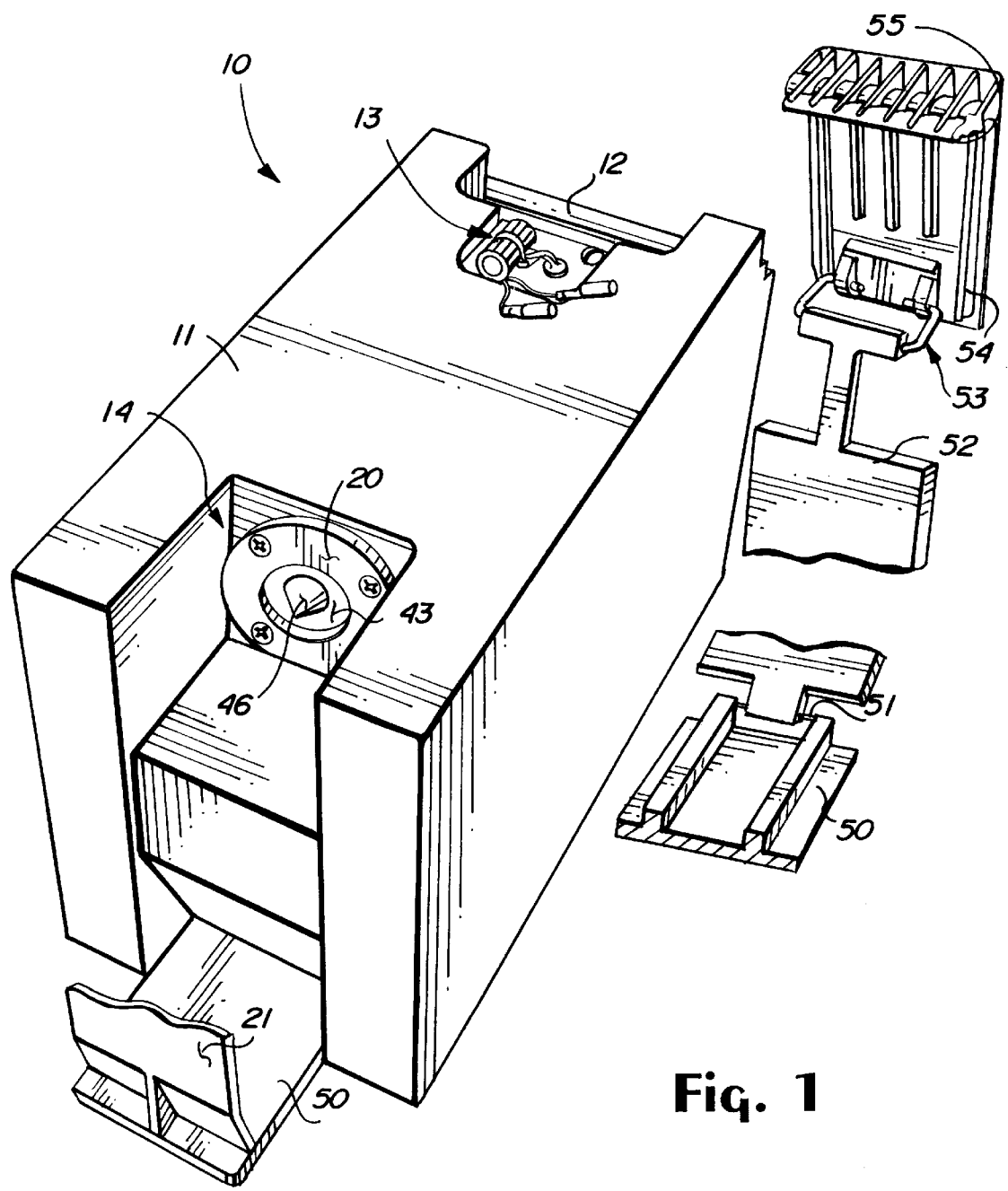
FIG. 1 is a top perspective view of one embodiment of an exemplary tank assembly according to the present invention with a tank mounted component of a fluid tight connection according to the invention.

A combined sewage holding and vacuum tank assembly, in one exemplary embodiment thereof, is shown generally by reference numeral 10 in FIG. 1. The assembly 10 includes a tank 11 which may be simply a sewage holding tank, but preferably is a combined sewage holding tank and vacuum reservoir, for use with a marine or RV vacuum sewage system. The tank 11 may be made of metal or plastic, or any other suitable material, and preferably includes at least one handle 12 which allows one to grasp and readily remove, reinsert, and/or carry the tank 11. The tank 11 is mounted in any suitable conventional position within a boat or recreational vehicle. The tank 11 may have any conventional level sensing system, vent system, or other suitable conventional components, which are illustrated only schematically at 13 in FIG. 1. The tank 11 also includes an inlet, shown generally at reference numeral 14 in FIG. 1, which will be described in more detail hereafter, and may have an outlet for draining sewage from the tank 11. One form that the outlet can take is illustrated schematically at 15 in FIG. 6 where adjacent the bottom 16 of the tank 11, and on the opposite side thereof from the inlet 14, an outwardly threaded tube is provided which may be closed in an air and liquid tight manner by a screw-on cap 17.

Figure 2A:
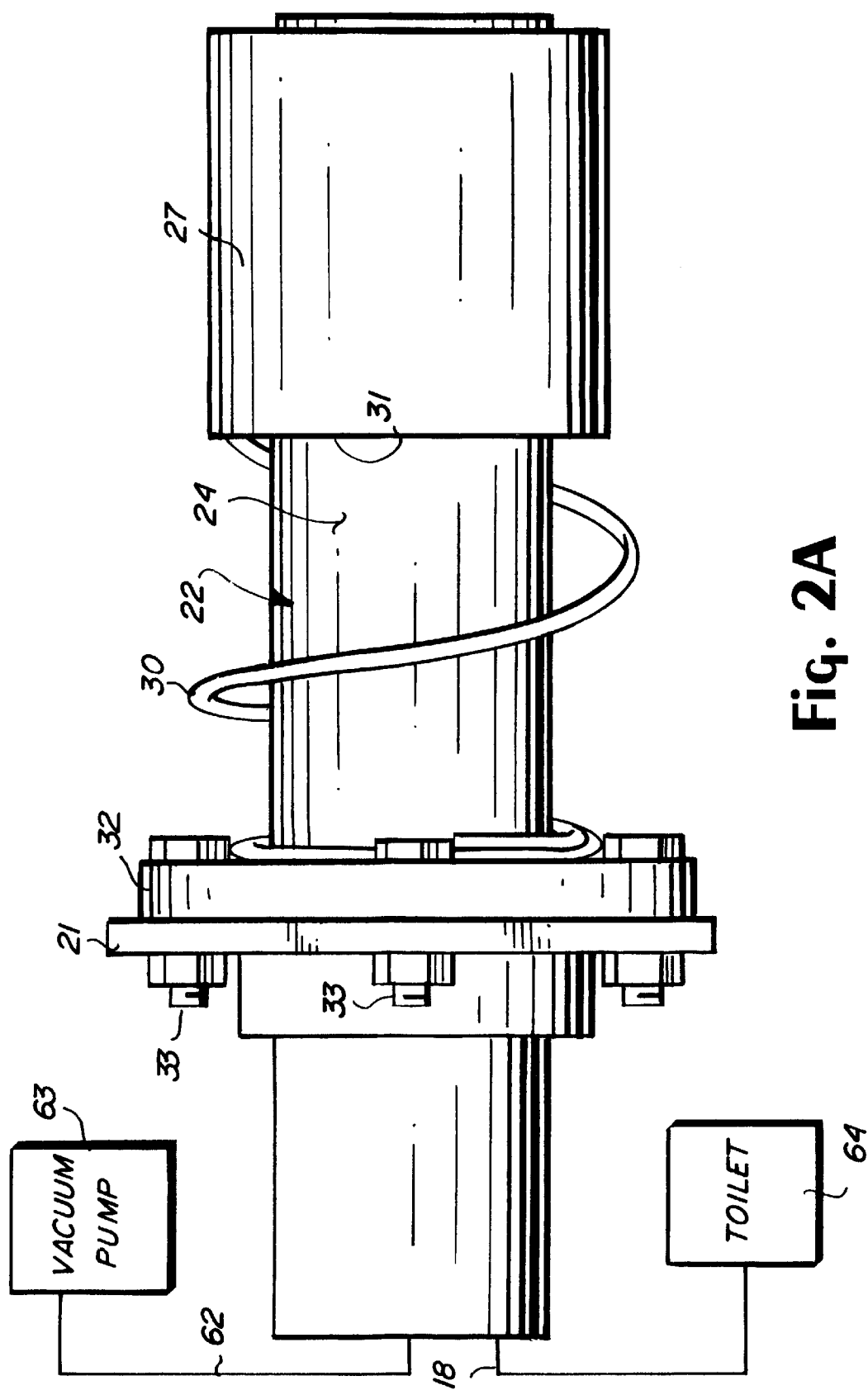
FIG. 2A is a side view of the conduit connected component of the fluid tight connection according to the invention with the cover shown biased into a position covering the opening therein.
Figure 2B:
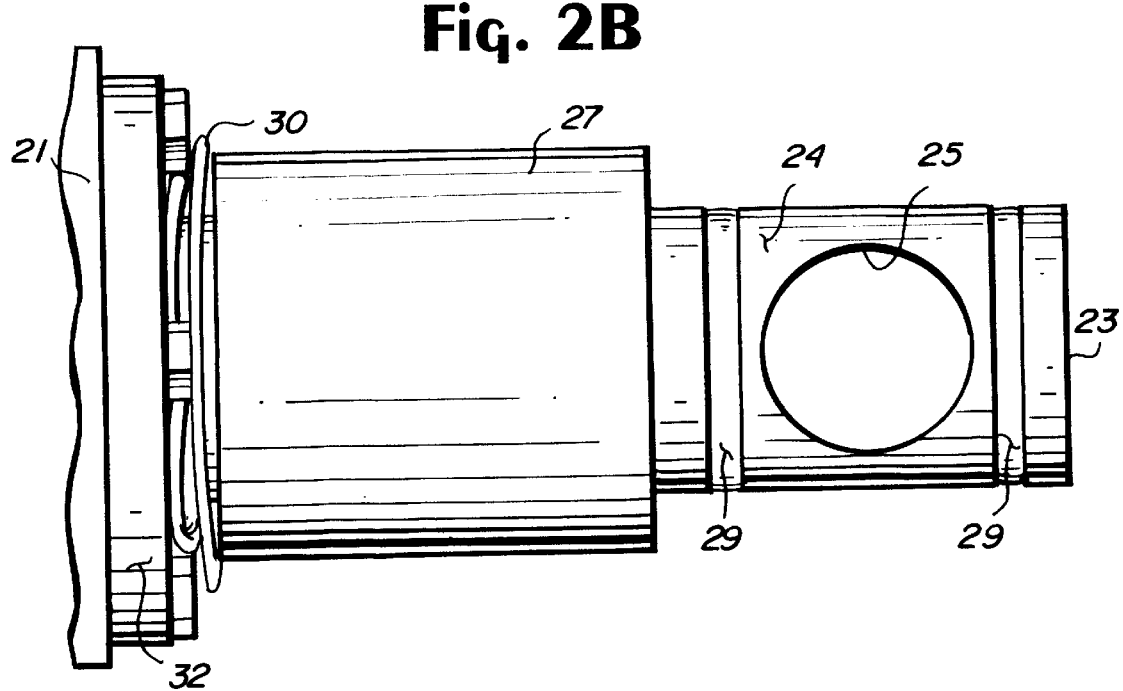
FIG. 2B is a view like that of FIG. 2A only showing the cover moved to a position uncovering the opening therein.
Figure 3:
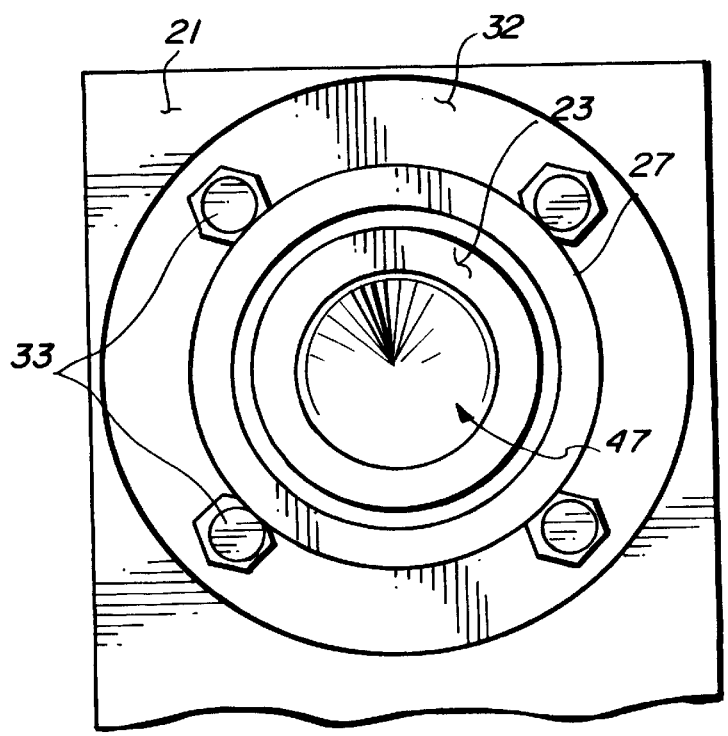
FIG. 3 is a front view of the component of FIGS. 2A and 2B.

At the inlet 14 is provided one-half of a substantially no-drip fluid (that is air, vacuum and liquid) tight connection for connecting the tank 11 to a conduit, shown schematically at 18 in FIG. 2A. The inlet 14 includes a support plate 20 which is connected by screws, or otherwise connected (e.g. by welding, brazing, screw threads on the elements themselves, adhesive, etc.), to a wall of the tank 11, and which contains one elongated hollow element, while another elongated hollow element is connected to the plate 21. As seen in FIGS. 2A, 2B and 3, the connection according to the invention includes a first elongated hollow element, such as the tube 22, which has a closed end wall 23 and a circumferential wall 24 with inner and outer surfaces. A first opening 25 (see FIGS. 2B and 5) extends completely through the circumferential wall 24 between the inner and outer surfaces. While FIGS. 2B and 5 show two in line openings 25, only one need be provided in some circumstances, or more than two may be provided where appropriate.

The connection according to the invention also includes an elongated first opening cover 27 which—in the embodiments illustrated in the drawings—comprises a tubular sleeve open at both ends. The cover 27 is mounted so that it engages the outer surface of the circumferential wall 24 in substantially fluid tight engagement, and is reciprocal with respect to the first hollow element 22 to move between a first position (illustrated in FIG. 2A) covering the first opening 25 and substantially preventing fluid passage therethrough, and a second position (FIG. 2B) at least partially uncovering the first opening 25 to allow fluid passage therethrough (and in FIG. 2B the opening 25 shown completely uncovered). In order to provide substantially fluid tight engagement, between the inner surface of the cover 27 and the outer surface of the element 22 may be two or more conventional O-rings 29 (see FIG. 2B), on opposite sides of the opening 25 along the length of the circumferential wall 24. Other conventional ways of providing substantially fluid tight engagement also may be provided.

While there can be a relatively tight fit between the cover 27 and the circumferential wall 24 so that the cover 27 will stay in a position to which it has been moved, preferably a biasing means is provided for biasing the cover 27 to the first position (the FIG. 2A position) thereof. While the biasing means may comprise any conventional biasing device, such as any type of spring, compressible material, pneumatic element, or the like, in the preferred embodiment illustrated in the drawings the biasing means takes the form of a simple metal (or plastic) coil spring 30 which engages a recessed portion of the end 31 of the cover 27 at one end thereof, and a relatively stationary support, such as the collar 32 connected by bolts 33 (or welding or any other conventional attachment) to the plate 21 as seen in FIG. 2A. The spring constant of the spring 30 is selected to ensure that the spring 30 can snap the cover 27 from the position illustrated in FIG. 2B to the position illustrated in FIG. 2A despite the frictional engagement between the inner surface of the cover 27 and the O-rings 29 and/or the outer surface of the circumferential wall 24.

Figure 4:
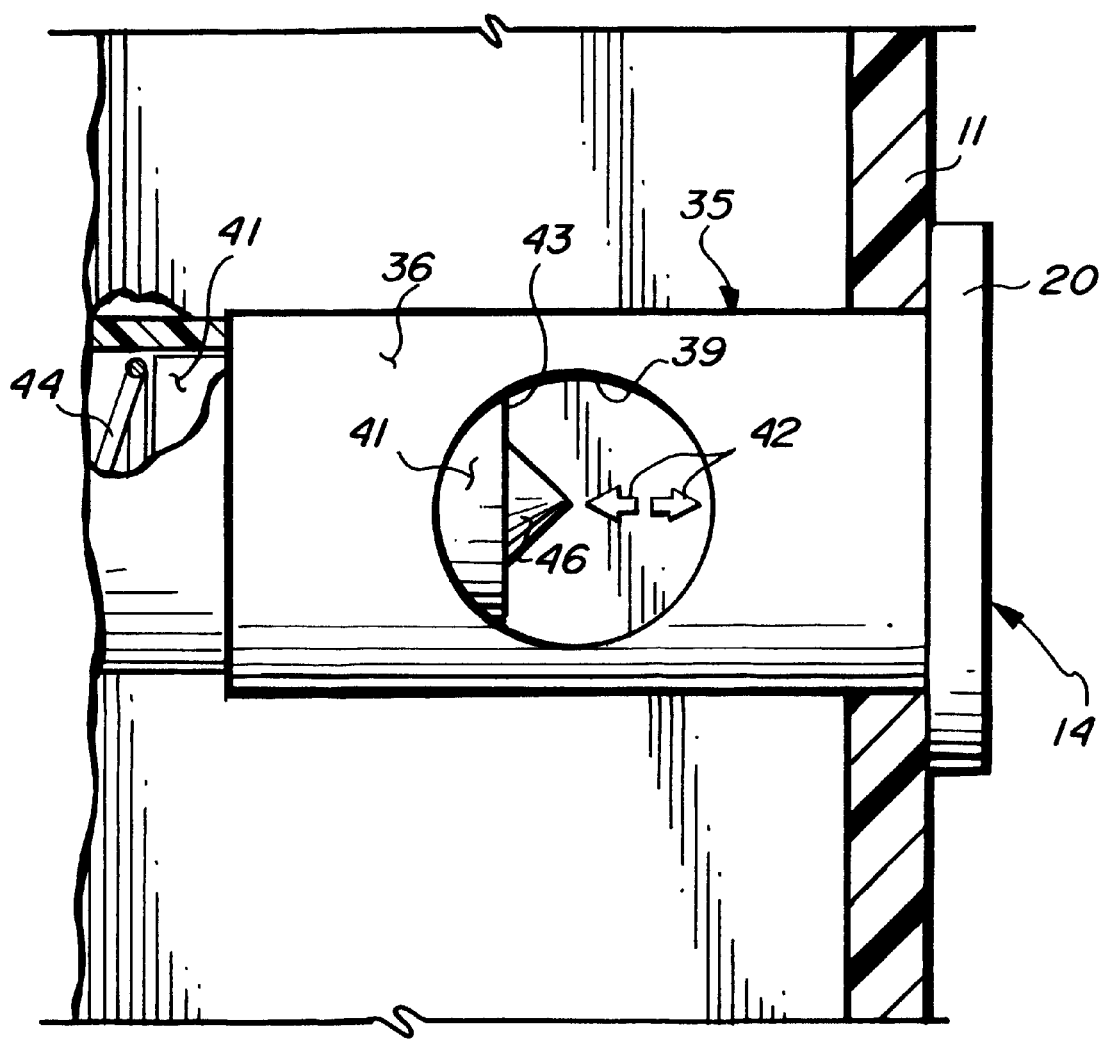
FIG. 4 is a top view, with the tank cut away for clarity of illustration, showing the tank mounted connection component blocking element moved to a position substantially unblocking the opening therein.
Figure 5:
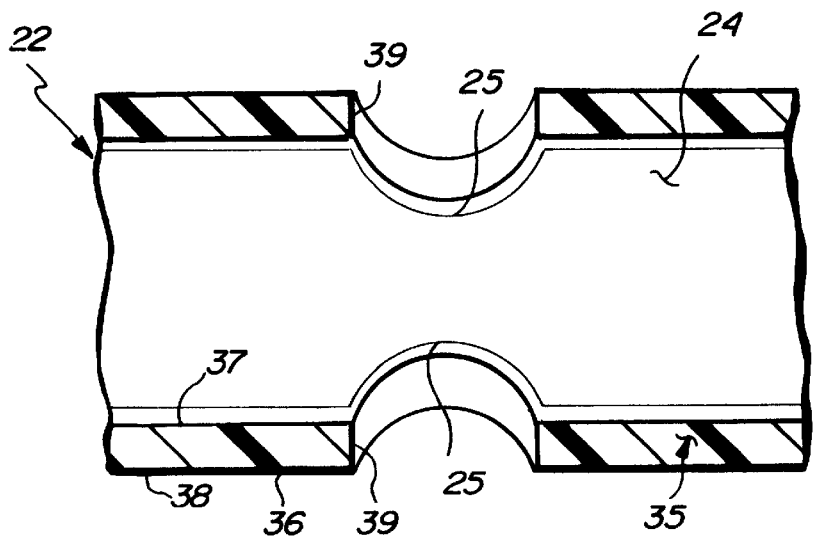
FIG. 5 is a side view, partly in cross-section and partly in elevation, schematically illustrating the hollow elements of the connection of FIGS. 1 through 4 when the openings therein are aligned.

The exemplary connection component at the inlet 14 is seen most clearly in FIGS. 1, 4, and 5. The connection component at the inlet 14 comprises a second elongated hollow element 35 having a circumferential wall 36 with an inner surface 37 and an outer surface 38 (see FIG. 5). A second opening 39 (see FIGS. 4 and 5) is provided in the wall 36 extending therethrough from the outer surface 38 to the inner surface 37. While in FIG. 5 two openings 39 are illustrated, in alignment with the openings 25 in the first element 22, only one opening 39, or more than two openings 39, may be provided where appropriate.

In the exemplary embodiment illustrated in the drawings the second elongated hollow element 35 also has a tubular configuration; that is like the first element 22, it is circular in cross-section. However alternatively it could have a polygonal cross-section, especially where the first element 22 does.

The connection component associated with the inlet 14 also comprises an elongated blocking element 41 for blocking the second opening 39. The blocking element 41 is mounted in a substantially fluid tight engagement with the inner surface 37 of the element 35 and reciprocal with respect to the element 35—as indicated by the arrows 42 in FIG. 4—to move between a first position (see FIG. 1) blocking the second opening 39, to a second position (see FIGS. 4 and 5) at least partially exposing the opening 39 to allow fluid passage therethrough. The blocking element 41 has a closed end wall 43 (FIGS. 1 and 4). The blocking element 41 also has second biasing means associated therewith for biasing it to the first position (FIG. 1) blocking the second opening 39. The second biasing means may be the same variety of structures as the first biasing means, but in the preferred embodiment comprises a second coil spring, as illustrated at 44 in FIG. 4, acting between the blocking element 41 and a relatively stationary support (not shown).

While in the preferred embodiment illustrated in FIGS. 1 through 6 the second element 35 is mounted within the tank 11. It may alternatively be mounted exteriorly of the tank 11, or partly exteriorly and partly interiorly.

While not seen in FIGS. 4 and 5, if desired O-rings of conventional construction, or other seal-facilitating elements, can be provided between the elements 22, 35 when they cooperate as illustrated in FIG. 5. As also seen in FIG. 5, the elements 22, 35 have a substantially telescopic relationship when moved into operative association with one another. According to the present invention it is also desirable to provide initial positioning elements, at least one associated with each of the blocking element end wall 43 and the first hollow element end wall 23. The positioning elements cooperate so that when the first hollow element 22 and the blocking element 41—which preferably have substantially the same cross-sectional shape and dimensions—are moved into operative association with each other the positioning elements ensure proper relative positioning thereof, allowing smoother relative movement to compress the springs 30, 44. In the embodiment illustrated FIGS. 1, 3 and 4 of the drawings, the positioning elements comprise a centrally located conical projection 46 on the blocking element 41 end wall 43, extending outwardly therefrom as seen in FIGS. 1 and 4, and a cooperating conical shaped centrally located depression 47 (see FIG. 3) centrally located in end wall 23. Alternatively a large number of projections and cooperating depressions can be provided, one wall 23, 43 having some projections and/or openings, and the other having cooperating openings and/or projections; and/or the projections could have different shapes, such as hemispherical, square, cylindrical, or the like.

The connection according to the invention also preferably comprises a holding element which releasably holds the cover 27 in the position of FIG. 2B and the blocking element 41 in the position of FIG. 4 (or even further retracted so as not to block the opening 39 at all, as illustrated in FIG. 5), against the bias of the biasing means (e.g. 30, 44) so that fluid flows through the elements 22, 35 between the tank 11 and the conduit 18. In the embodiment illustrated in FIG. 1 this holding element includes the support plate 21 for the element 22 which is connected to a bottom plate 50, which is connected by a pivotal connection 51 to a plate 52 opposite the plate 21 (that is on the other side of the tank 11 therefrom), the plate 52 in turn connected by a pivotal connection 53 to a locking element 54. The locking element 54 may include a surface 55 which engages the handle 12 (which handle 12 is stationarily mounted on the tank 11), and by moving the pivotal connection 53 over center locking action is provided. When so locked the cover 27 is essentially in the position illustrated in FIG. 2B while the openings 25, 39 cooperate as illustrated schematically in FIG. 5.

A wide variety of other forms may be provided for all of the components described above. For example in the embodiment of FIG. 7—where components comparable to those in the FIGS. 1 through 6 embodiment are shown by the same reference numeral only preceded by a "1"—the tank 111 has the inlet 114 in a top surface 60 thereof with another opening capped by the cap 117 also provided on the top surface 60, or in any other surface thereof. In this case the blocking element face 143 has a hemispherical depression 147 therein which cooperates with hemispherical projection 146 on the end wall of the first hollow element 122 having conduit 118 connected thereto. The handle 112 may also be provided in the top surface 60 and may pivot from a stored position in which it is flush with the top surface 60 by being provided in a recess 61, to the operative position illustrated in FIG. 7. In this embodiment a second conduit 62 is also shown connected to the element 122, for example the conduit 118 being connected to a toilet 64 (shown schematically in FIG. 2A) or sewage pump, and the conduit 62 connected to a vacuum pump, such as the vacuum pump 63 illustrated schematically in FIG. 2A. The toilet 64 and vacuum pump 63 may be as shown in U.S. Pat. No. 5,408,704 and in U.S. Ser. No. 08/551,029 (the disclosures of which are incorporated by reference herein).

Figure 7:
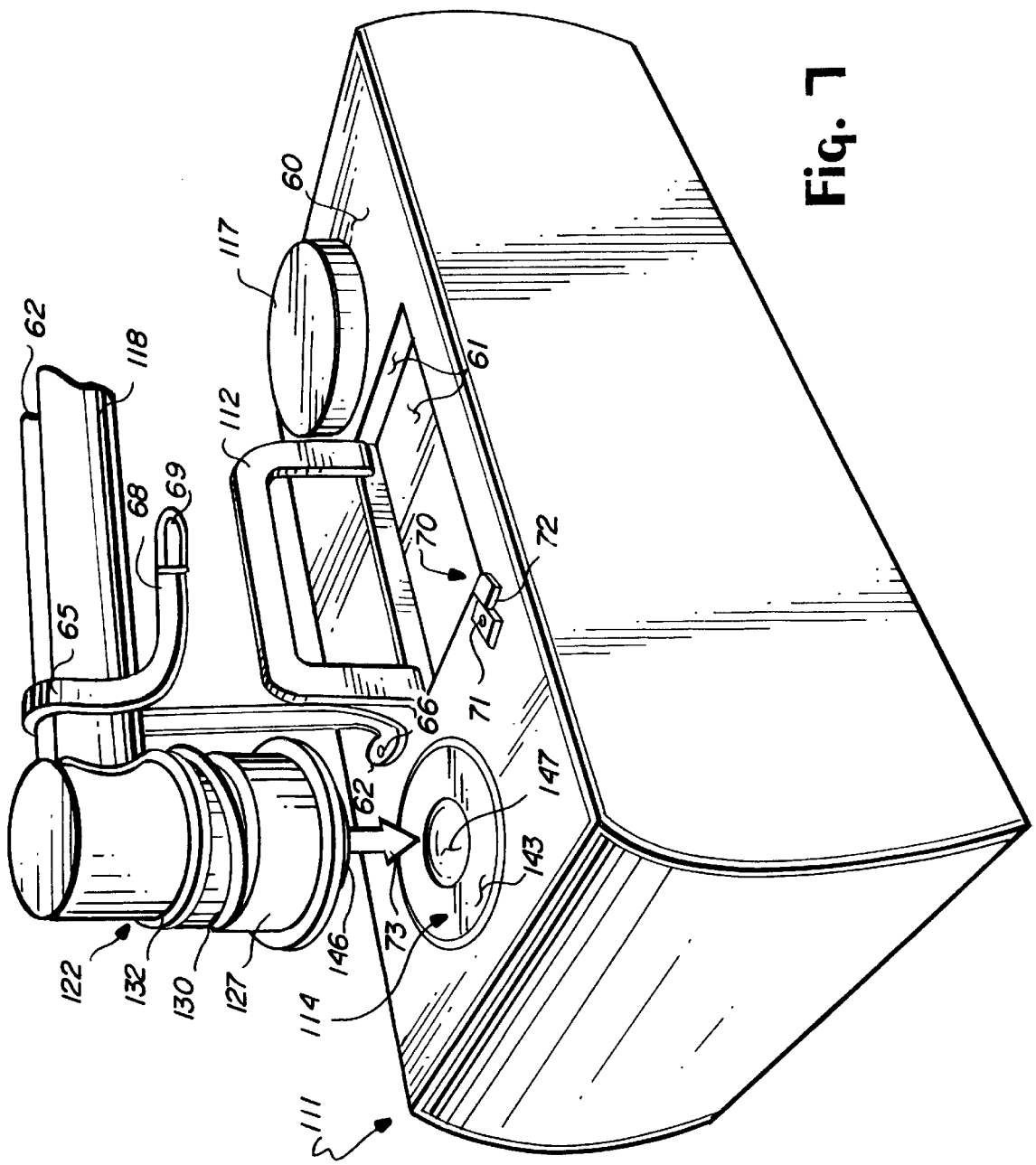
FIG. 7 is a top perspective view of a second embodiment of a tank assembly according to the invention, with another embodiment of a fluid tight connection component associated therewith.

In the embodiment of FIG. 7 the holding element is much simpler than the element 21, 50–55 illustrated in FIG. 1, taking the form of an elastic strap 65 that is fixed—e.g. by a screw 66—at one end 67 thereof, while the second end 68 thereof has a metal ring 69 which is designed to cooperate with a bracket 70 which is connected by a screw 71 to the top surface 60 of the tank 110, and has an under surface 72 spaced from the surface 60 and adapted to receive the ring 69. A similar ring 69 provided at end 67 could be cooperating with a like bracket 70. Therefore in this embodiment once the element 122 is moved downwardly—as indicated by arrow 73—to move the cover 127 against the bias of the spring 130 and to move the blocking element connected to the end wall 143, to expose the openings in the hollow elements (substantially as illustrated in FIG. 5) to each other, the entire structure 122, 118, etc. is held in place by the elastic nature of the band 65 when the ring 69 is looped into contact with the under surface 72.

Figure 8:
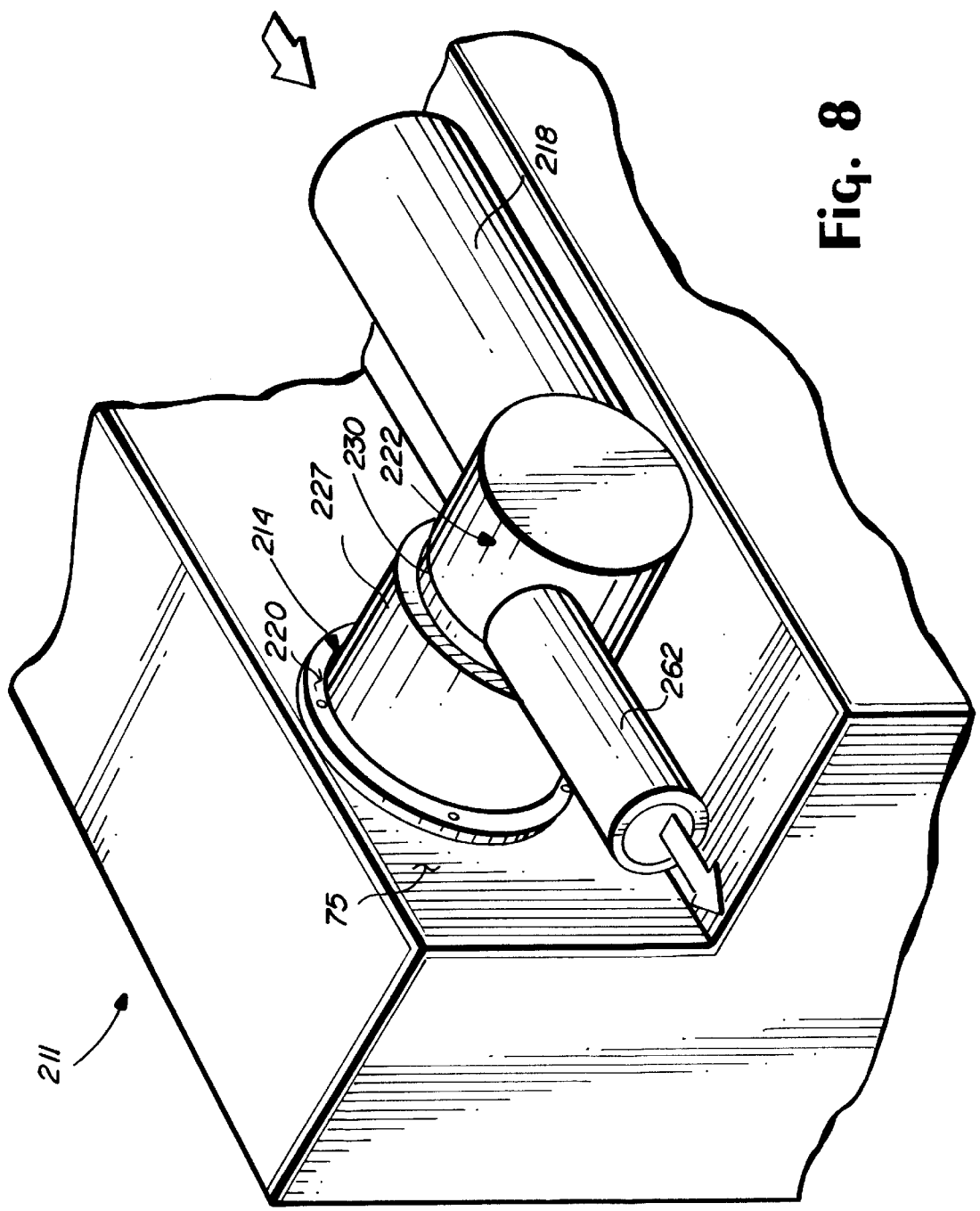
FIG. 8 is a detail perspective view of another embodiment of a tank assembly with a substantially fluid tight connection according to the invention.

FIG. 8 illustrates yet another embodiment in which components comparable to those in the other embodiments are shown by the same two digit reference numeral only preceded by a "2". In this embodiment the biasing means 230 is in the form of a compressible collar of rubber or like elastic material, and although the element 22 is shown held in place in association with the tank 211 the holding element is not shown. The holding element may be internal detent means or structures on the element 22 which cooperate with detent elements associated with the tubular element 35, or may comprise cooperating magnetic elements, or any other suitable conventional mechanical, magnetic, or electromagnetic elements which can hold the components against the bias of the biasing means.

Figure 9:
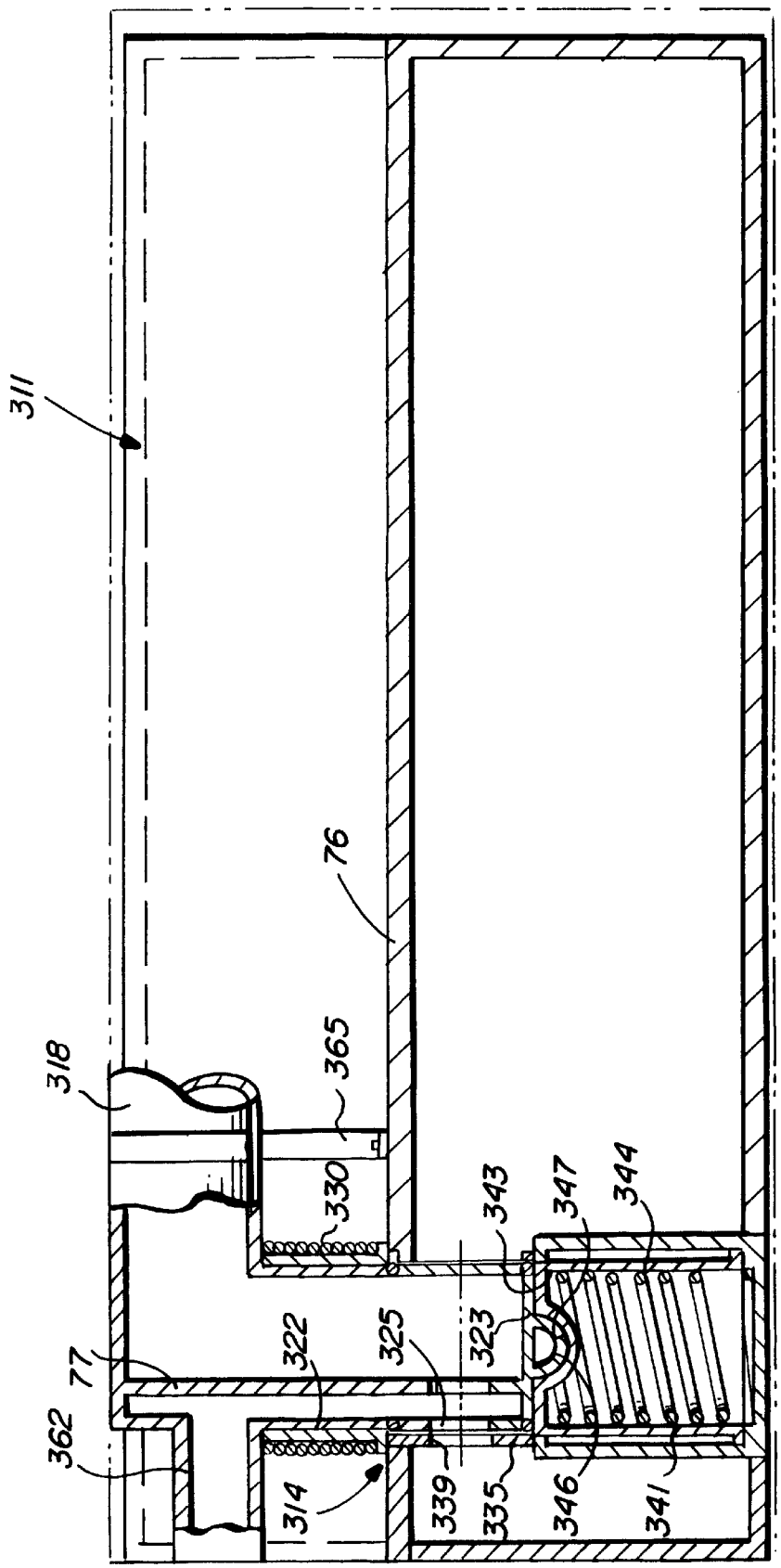
FIG. 9 is a side view, partly in cross-section and partly in elevation, of another exemplary embodiment of a tank assembly and fluid tight connection according to the invention.

FIG. 9 is similar to FIG. 8, components in FIG. 9 comparable to those in the other embodiments shown by the same two digit reference numeral only preceded by a "3". However different than FIG. 8 in which the inlet 214 is in the vertical face 75 of the tank 211, the inlet 314 is provided in a horizontal face 76 of the tank 311. In this embodiment the biasing means (coil springs 330, 344) are shown completely compressed with the openings 325, 339 in alignment, and an interior dividing wall 77 is provided between the conduits 318, 362. In this embodiment a blocking element 341 end wall 343 has a hemispherical depression 347 cooperating with the hemispherical projection 346 extending from the end wall 326 of the element 322. An elastic strap 365 can be used as the holding element.

Figure 10:
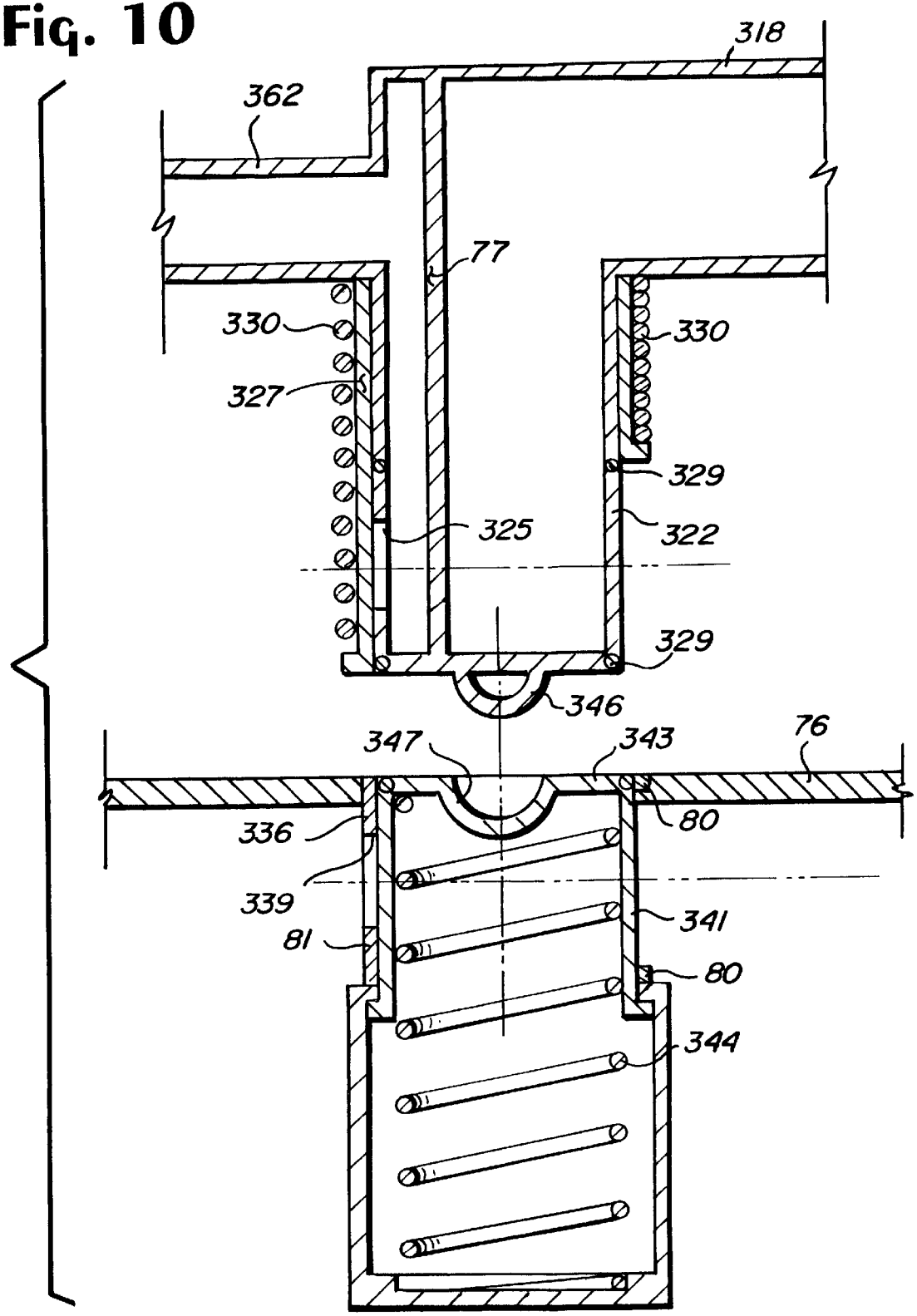
FIG. 10 is a detail cross-sectional view of the connection elements of the assembly of FIG. 9, shown detached from each other.

FIG. 10 is an exploded enlarged view of the connection components of the embodiment of FIG. 9, showing the components separated from each other. For the element 322 the left side is shown with the cover 327 biased by the spring 330 into the position covering the opening 325, while the right side is shown compressed (as in FIG. 9) just for the purposes of clarity of illustration.

Figure 11:
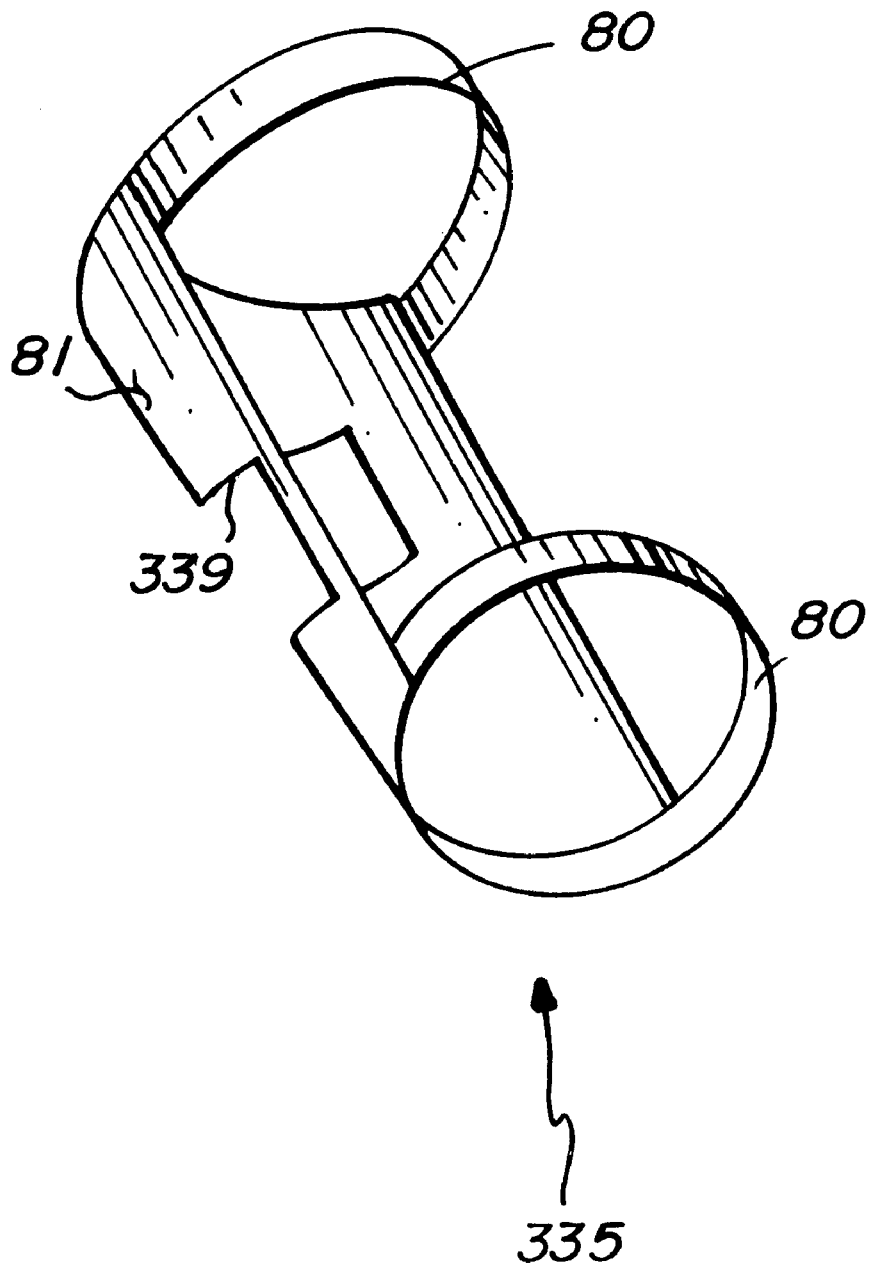
FIG. 11 is a top perspective view of the second hollow element of the connection of FIG. 10.

In the embodiment of FIGS. 9 and 10, as illustrated more clearly in FIG. 11, the second elongated hollow element 335, instead of having a tubular configuration, has a configuration wherein the ends are provided by annular ends 80 with a tubular segment 81 extending between them, the tubular segment 81 typically having an arcuate extent of between about 90° and 180° (approximately 180° being illustrated in FIG. 11), with the opening 339 therein. In this embodiment—as in other embodiments—the connection components may be connected to the tank 311 by welding, an interference fit, screws, or other conventional structures, and to the conduits 318, 362 by integral walls, screw on hose connections, or any other suitable conventional mechanisms.

Figure 12:
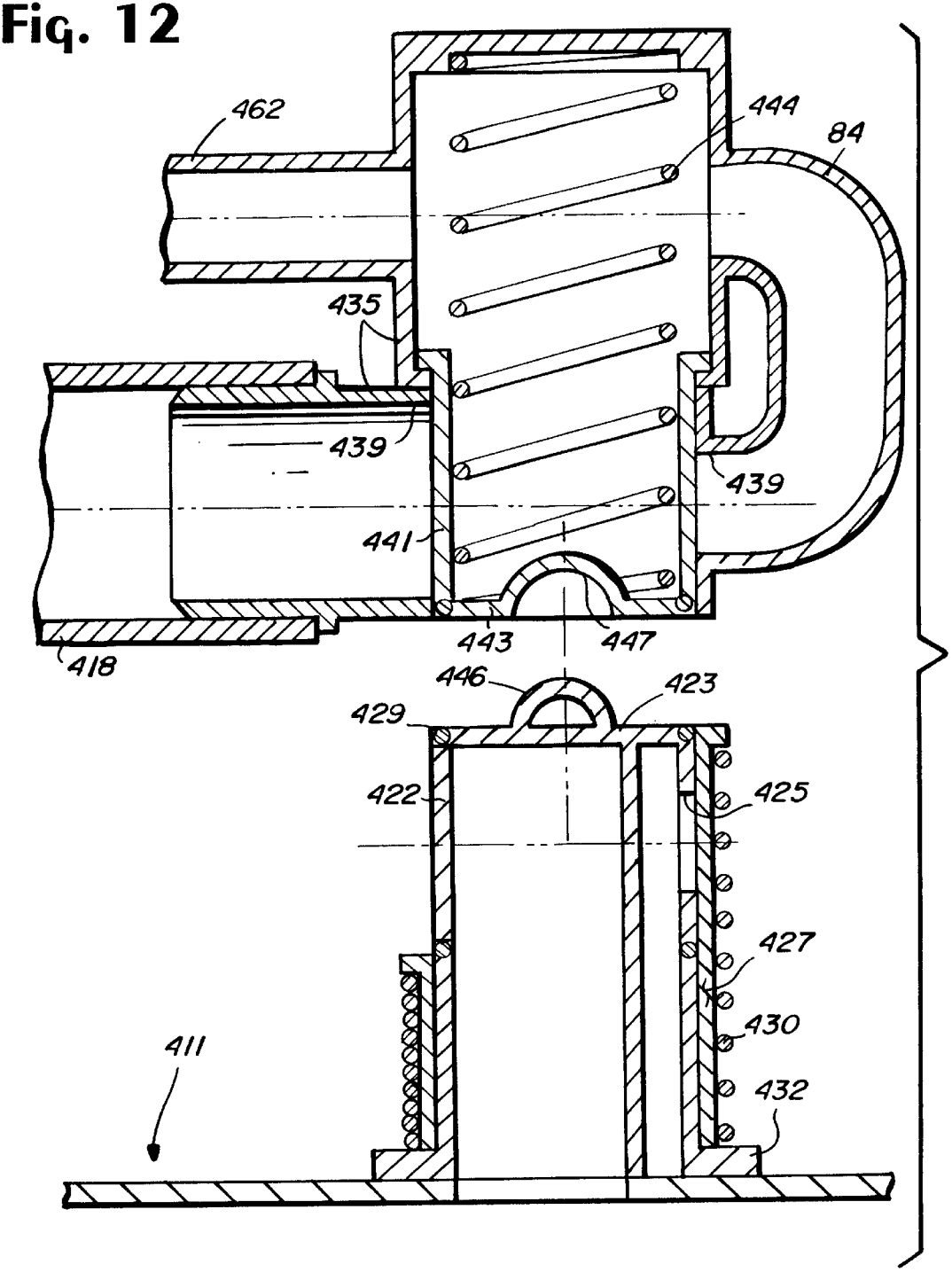
FIG. 12 is a view like that of FIG. 10 of yet another embodiment of an exemplary connection according to the present invention.

In the embodiment illustrated in FIG. 12 components comparable to those in the other embodiments are shown by the same two digit reference numeral only preceded by a "4". In this embodiment the connection component associated with the tank 411 extends outwardly from the tank 411 instead of being disposed interiorly of the tank 411. Also in this embodiment the first hollow element 422 is what is connected to the tank 411, whereas the second hollow element 435 and the blocking element 441 are associated with the conduits 418, 462. In this embodiment the conduits 418, 462 are also connected by the tubular loop 84.

Figure 13:
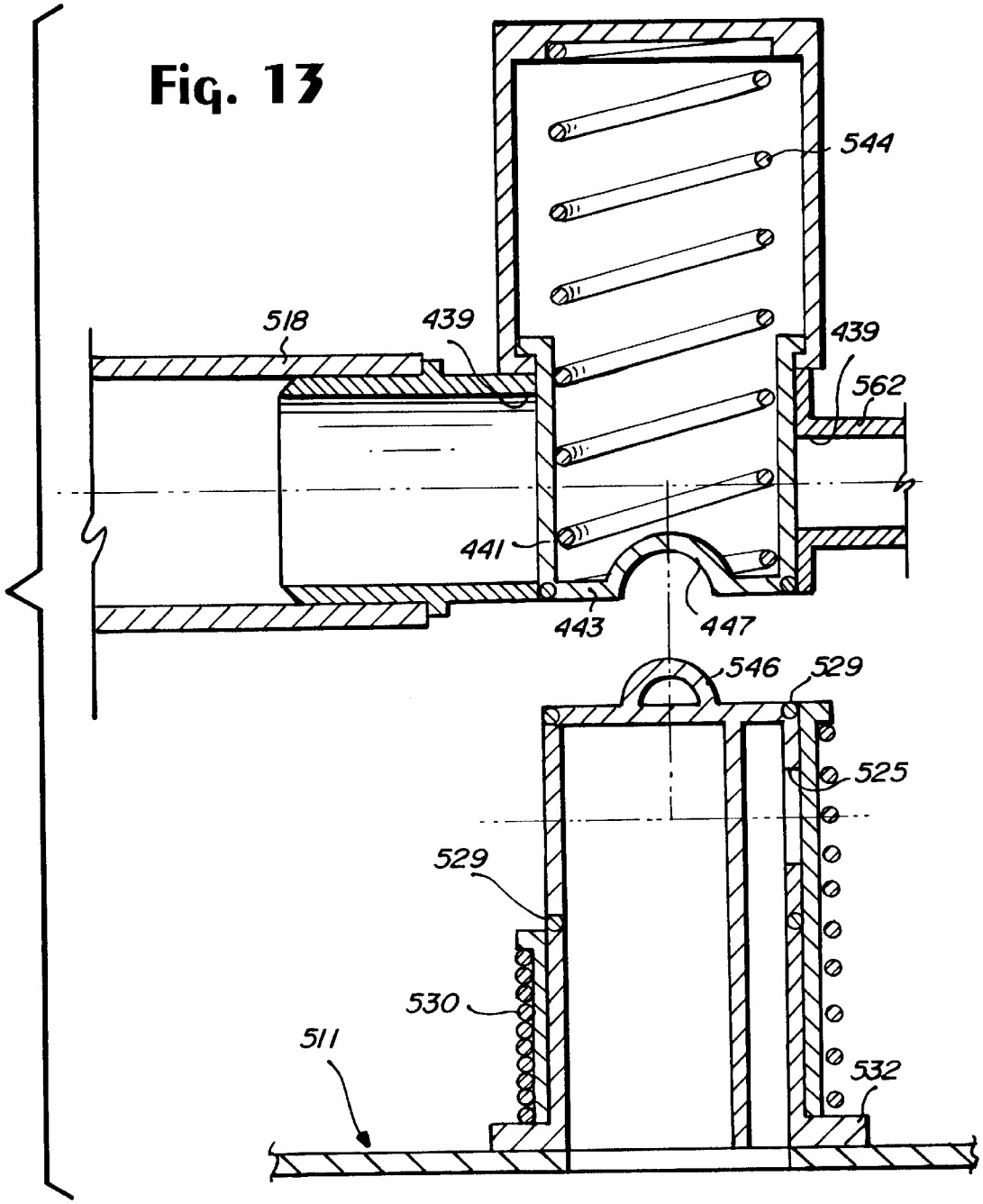
FIG. 13 is a view like that of FIG. 12 only for another embodiment of a connection according to the invention.

In the embodiment of FIG. 13 components comparable to those in the other embodiments are shown by the same two digit reference numeral only preceded by a "5". In this embodiment the only thing different between it and the FIG. 12 embodiment is the particular arrangement of the conduits 518, 562.

Figure 14:
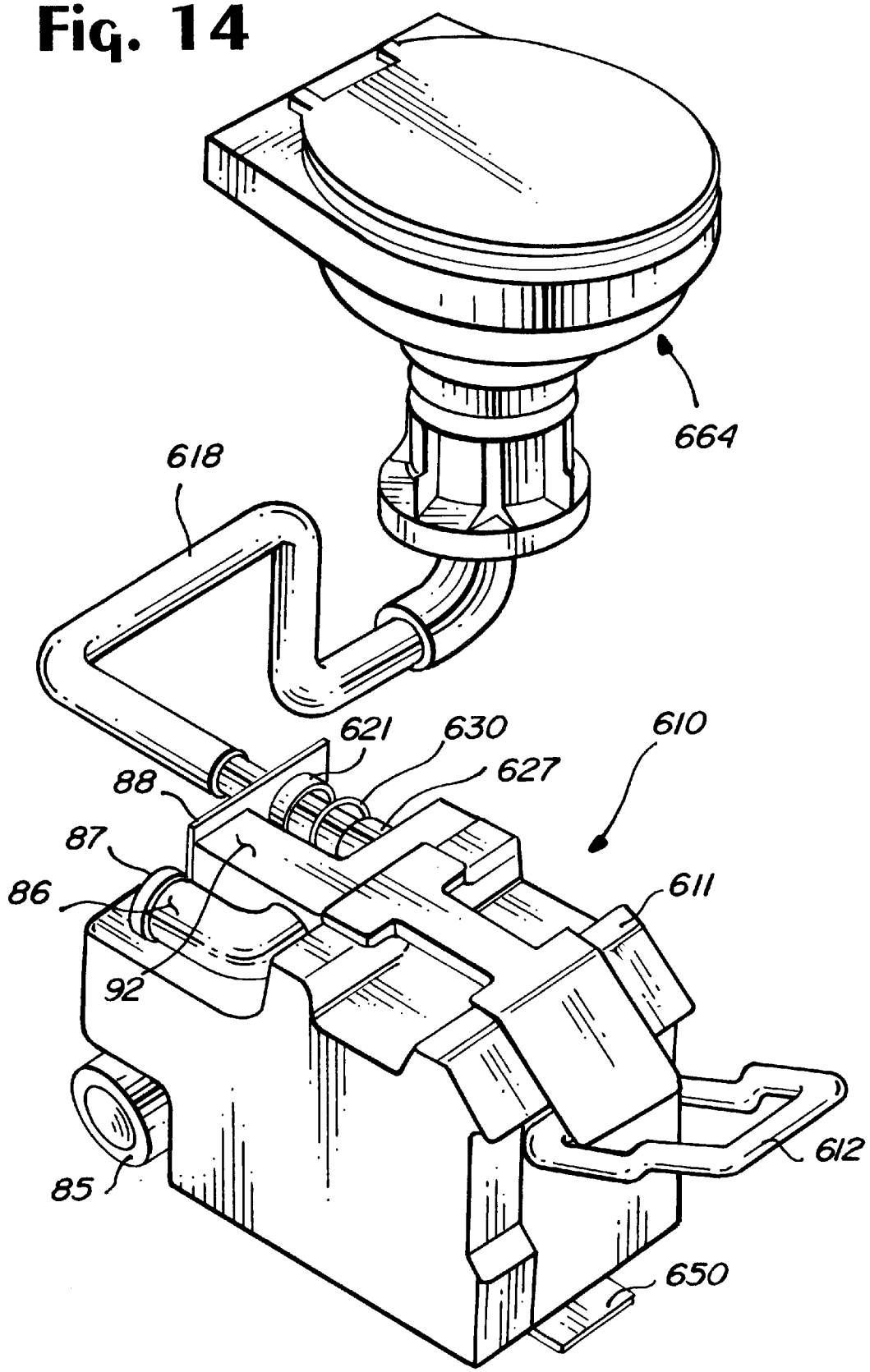
FIG. 14 is a perspective schematic view of another exemplary tank with no drip, fluid tight, connection according to the present invention in association with a marine toilet.

Another embodiment according to the present invention is illustrated in FIGS. 14 and 15. In this embodiment components comparable to those in the other embodiments are shown by the same two digit reference numeral only preceded by a "6".

FIG. 14 shows a tank assembly 610 according to the invention connected by a conduit 618 to a marine toilet 664. The tank 611 includes a handle 612 and two or more rolling support elements, such as wheels 85 (or casters or rollers) for ease of movement. The tank 611 is preferably unreinforced plastic, such as shown in U.S. application Ser. No. 08/551,029 filed Oct. 31, 1995, and Australian application serial no. 14895/97 filed Feb. 25, 1997, having no continuously flat area greater than about 80 square inches, or about 200 square centimeters, as shown in co-pending U.S. application Ser. No. 08/551,029 filed Oct. 31, 1995 and Ser. No. 08/839,267 filed Apr. 17, 1997 (atty. dkt. 19-125), which are incorporated by reference herein. The tank 611 elements 85 are mounted on a wall of the tank opposite the handle 612, so that upon lifting up on the handle 612 one can lift the front of tank 611 off the ground and pull it along supported by the wheels 85. The handle 612 may pivot down into an inoperative position.

Figure 6:
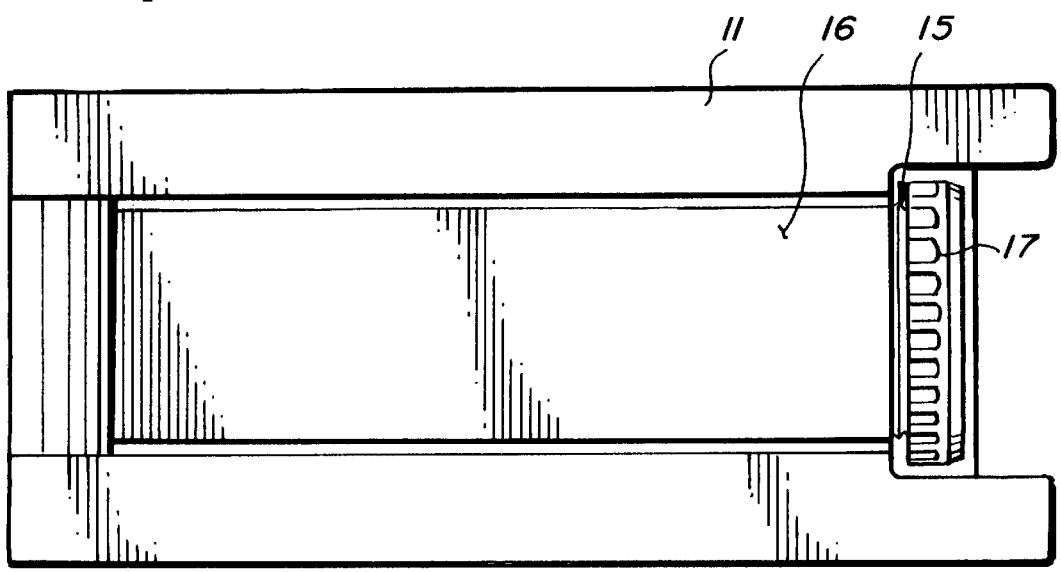
FIG. 6 is a bottom plan view of the tank of FIG. 1.

In the embodiment of FIGS. 14 and 15 another connection 86 is provided, capped by a cap 87, which is similar to the connection 15 capped by the cap 17 in the FIG. 6 embodiment. However the connection 86 may be pivoted to any desired position and is adapted to be connected up to a pump out pump or the like. In this regard the connection is similar to that shown in WO 96/410059, or co-pending application Ser. No. 08/838,238 filed Apr. 17, 1997 (atty. dkt. 19-125), the disclosures of which are hereby incorporated by reference herein.

FIG. 15 shows a first tubular element 622 detached from the inlet 614. The tube 622, with biasing spring 630 and cover 627, is mounted on a plate 621 in a manner that is similar to that associated with the FIGS. 1 through 6 embodiment. However in this case the plate 621 is shaped differently and other components are provided. A bottom plate 650 attached to the upstanding plate 621 preferably has the vacuum pump 663 mounted thereon, which is connected up via conduit 662 to the "air" side of the dividing wall 677 in the conduit 618.

In the embodiment illustrated in FIGS. 14 and 15, the holding means for holding the air tight connection components (622, and the component corresponding to the component 35, not seen in the drawings) against the bias of the biasing means (such as the spring 30) includes an extension portion 88 of the plate 621 which has an opening 69 therein for receipt of a threaded bolt 90, or a comparable fastener. The shank of the bolt 90 passes into operative association with the opening 91 in a portion 92 of the tank 611. The opening 91 is preferably an internally threaded, closed end opening, that does not allow communication to the atmosphere from the interior of the tank 611. By moving the tank 611 into association with the element 622 so that the spring 630 is compressed and an air tight, no drip, connection is made between the inlet 614 and the element 622, the opening 91 becomes aligned with the opening 88 and the bolt 90 is screw threaded—or otherwise appropriately fastened—into place. This holds the components together as illustrated in FIG. 14. If desired other mechanisms can be used to hold the tank 611 to the plate 650, such as other fasteners, detents, cooperating peaks and valleys, etc.

Because of the cooperation of the hollow elements with the openings therein, the biasing provided by the biasing means (or by the cover or blocking element being held in the positions to which they are moved), and by the relative dimensioning and shapes of the components, a quick connect and disconnect can be provided for a conduit to a tank. The quick connect or disconnect provides a substantially fluid tight connection, and also provides a substantially no drip connection. That is the sealing action at the connection is provided so quickly and effectively that there is insufficient time for liquid to drip while the connection is being made or the conduit is being disconnected from the tank. Once the conduit is disconnected from the tank one can grab the handle (e.g. 12, 112, 612) and carry or roll the tank 11, 111, 611 from the RV or boat to have it emptied, and then replace it with another tank, or replace the same tank once it is emptied.

While the invention has been herein shown and described in what is presently conceived to be the most practical and preferred embodiments thereof it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A substantially no-drip fluid tight connection between a conduit and a tank, comprising:
    a first elongated hollow element having an end wall, a circumferential wall with inner and outer surfaces, and a first opening extending through said circumferential wall between said inner and outer surfaces;
    an elongated first opening cover mounted in substantially fluid tight engagement with said outer surface of said first hollow element and reciprocal with respect to said first hollow element to move between a first position covering said first opening and substantially preventing fluid passage therethrough, and a second position at least partially uncovering said first opening to allow fluid passage therethrough;
    a second elongated hollow element having a circumferential wall with inner and outer surfaces, and a second opening extending through said circumferential wall between said inner and outer surfaces;
    an elongated second opening blocking element mounted in substantially fluid tight engagement with said inner surface of said second hollow element and reciprocal with respect to said second hollow element to move between a first position blocking said second opening and substantially preventing fluid passage therethrough, and a second position at least partially exposing said second opening to allow fluid passage therethrough, said blocking element having an end wall; and
    biasing means for biasing said cover to said first position and said blocking element to said first position;
    one of said hollow elements configured to be connected to a tank, and the other of said hollow elements configured to be connected to a conduit.

2. A connection as recited in claim 1 wherein said biasing means comprises a first coil spring disposed over said first hollow element outer surface and mounted between said cover and a first support.

3. A connection as recited in claim 2 wherein said first hollow element is connected to a conduit, and said second element to a tank.

4. A connection as recited in claim 3 further comprising a holding element which releasably holds said cover and said blocking element in said second positions thereof against the bias of said biasing means, so that fluid flows through said first and second hollow elements between said conduit and said tank.

5. A connection as recited in claim 2 wherein said biasing means further comprises a second coil spring disposed within said second hollow element and acting between said blocking element and a second support.

6. A connection as recited in claim 4 wherein said second hollow element is within said tank, and wherein said first hollow element has substantially the same cross-sectional shape and dimensions as said blocking element.

7. A connection as recited in claim 6 further comprising an initial positioning element associated with each of said blocking element end wall and said first hollow element end wall so that when said first hollow element and said blocking element are moved into engagement with each other said positioning elements ensure proper relative positioning thereof.

8. A connection as recited in claim 1 further comprising O-ring seals between said first and second hollow elements to seal around said first and second openings when said cover and blocking elements are in said second positions thereof.

9. A connection as recited in claim 1 further comprising a holding element which releasably holds said cover and said blocking element in said second positions thereof against the bias of said biasing means, so that fluid flows through said first and second hollow element first and second openings.

10. A connection as recited in claim 1 further comprising an initial positioning element associated with each of said blocking element end wall and said first hollow element end wall so that when said first hollow element and said blocking element are moved into engagement with each other said positioning elements ensure proper relative positioning thereof.

11. A connection as recited in claim 1 wherein said first hollow element has substantially the same cross-sectional shape and dimensions as said blocking element.

12. A connection as recited in claim 11 wherein said first hollow element is tubular with a substantially circular cross section, and wherein said blocking element is cylindrical or tubular with at least one closed end and substantially circular in cross section.

13. A connection as recited in claim 12 wherein said second elongated hollow element comprises an annular end and a tubular segment connected to said annular end, said segment having said second opening therein.

14. A connection as recited in claim 1 wherein one of said hollow elements is connected to a tank; and wherein said tank comprises a marine or recreational vehicle sewage holding tank readily removably mounted in a boat or recreational vehicle, and having a handle thereon.

15. A connection as recited in claim 14 wherein said tank comprises a combined sewage holding and vacuum tank; and in combination with a vacuum pump operatively readily releasably connected thereto.

16. A connection as recited in claim 1 wherein said first hollow element is operatively connected to a plurality of conduits.

17. A combined sewage holding and vacuum tank assembly for a boat or recreational vehicle, comprising:

a tank body having an inlet;

a vacuum pump;

a conduit for operatively connecting said inlet to said vacuum pump; and means for providing a readily connectable and disconnectable, substantially air and liquid tight, substantially no drip, connection between said conduit and said inlet, comprising:

first and second elongated hollow elements primarily linearly moveable with respect to each other;

said first elongated hollow element having an end wall, a circumferential wall with inner and outer surfaces, and a first opening extending through said circumferential wall between said inner and outer surfaces;

an elongated first opening cover mounted in substantially fluid tight engagement with said outer surface of said first hollow element and reciprocal with respect to said first hollow element to move between a first position covering said first opening and substantially preventing fluid passage therethrough, and a second position at least partially uncovering said first opening to allow fluid passage therethrough;

said second elongated hollow element having a wall with inner and outer surfaces, and a second opening extending through said wall between said inner and outer surfaces; and an elongated second opening blocking element mounted in substantially fluid tight engagement with said inner surface of said second hollow element and reciprocal with respect to said second hollow element to move between a first position blocking said second opening and substantially preventing fluid passage therethrough, and a second position at least partially exposing said second opening to allow fluid passage therethrough, said blocking element having an end wall; and one of said hollow elements connected to said tank, and the other of said hollow elements connected to said conduit.

18. A tank assembly as recited in claim 17 wherein said first hollow element has substantially the same cross-sectional shape and dimensions as said blocking element; and further comprising an initial positioning element associated with each of said blocking element end wall and said first hollow element end wall so that when said first hollow element and said blocking element are moved into engagement with each other said positioning elements ensure proper relative positioning thereof.

19. A tank assembly as recited in claim 18 wherein said second hollow element is within said tank; said tank has rolling support elements; and a handle connected to said tank body to allow ready lifting, placement, and carrying of said tank body.

20. A tank assembly as recited in claim 17 further comprising biasing means for biasing said cover to said first position and said blocking element to said first position.

* * * * *